US012709706B2

(12) United States Patent
Alanqari et al.

(10) Patent No.: US 12,709,706 B2
(45) Date of Patent: Aug. 18, 2026

(54) COMPOSITIONS AND METHODS FOR BRANCHED CALCIUM LIGNOSULFONATE CEMENT DISPERSANTS

(71) Applicant: SAUDI ARABIAN OIL COMPANY, Dhahran (SA)

(72) Inventors: Khawlah A. Alanqari, Dhahran (SA); Abdullah Al-Yami, Dhahran (SA); Vikrant Wagle, Abqaiq (SA); Ali Alsafran, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 0 days.

(21) Appl. No.: 19/179,898

(22) Filed: Apr. 15, 2025

(65) Prior Publication Data

US 2026/0159747 A1 Jun. 11, 2026

Related U.S. Application Data

(62) Division of application No. 18/166,343, filed on Feb. 8, 2023, now Pat. No. 12,291,670.

(51) Int. Cl.
*C09K 8/467* (2006.01)
*C04B 7/02* (2006.01)
(Continued)

(52) U.S. Cl.
CPC ................ *C09K 8/467* (2013.01); *C04B 7/02* (2013.01); *C04B 24/008* (2013.01); *C04B 24/02* (2013.01);
(Continued)

(58) Field of Classification Search
CPC ......... C09K 8/467; C04B 7/02; C04B 24/008; C04B 24/02; C04B 24/18; C04B 24/40; C04B 28/04
See application file for complete search history.

(56) References Cited

U.S. PATENT DOCUMENTS 2,840,483 A * 6/1958 Morgan .................. C04B 28/04 106/719
4,003,431 A 1/1977 Novotny et al.
(Continued)

FOREIGN PATENT DOCUMENTS

CN 107890871 A 4/2018
CN 114315303 A 4/2022
(Continued)

OTHER PUBLICATIONS

A.P. Marques et al.; "Chemical Composition of Spent Liquors from Acidic Magnesium-Based Sulphite Pulping of Eucalyptus globulus;" Journal of Wood Chemistry and Technology, vol. 29, No. 4; Nov. 20, 2009.
(Continued)

*Primary Examiner* — Crystal J Lee
(74) *Attorney, Agent, or Firm* — Vorys, Sater, Seymour and Pease LLP

(57) ABSTRACT

Compositions may include a calcium lignosulfonate salt having syringyl groups of 2 to 10. The compositions may further include an alcohol, an aldehyde, and water. Cement slurries may include a lignosulfonate-based cement dispersant including a calcium lignosulfonate salt, an alcohol, an aldehyde, and water, wherein a total number of syringyl groups is 2 to 10. The cement slurries may further include a cement and water. Methods may include introducing a cement slurry into a wellbore penetrating a subterranean formation, wherein the cement slurry comprises a lignosulfonate-based cement dispersant, a cement, and water, and allowing the cement slurry to set to a concrete in a downhole zone of interest.

17 Claims, 6 Drawing Sheets

(51) Int. Cl.

| | |
|---|---|
| ***C04B 24/00*** | (2006.01) |
| ***C04B 24/02*** | (2006.01) |
| ***C04B 24/18*** | (2006.01) |
| ***C04B 24/40*** | (2006.01) |
| ***C04B 28/04*** | (2006.01) |
| ***C04B 103/40*** | (2006.01) |

(52) U.S. Cl.
CPC .............. *C04B 24/18* (2013.01); *C04B 24/40* (2013.01); *C04B 28/04* (2013.01); *C04B 2103/408* (2013.01); *C04B 2201/20* (2013.01)

(56) References Cited

U.S. PATENT DOCUMENTS

| | | | | |
|---|---|---|---|---|
| 5,358,566 A | 10/1994 | Tanaka et al. | | |
| 6,244,344 B1 * | 6/2001 | Chatterji | C04B 24/281 | 166/295 |
| 8,277,557 B2 | 10/2012 | Reknes | | |
| 8,946,396 B2 | 2/2015 | Reknes | | |
| 9,038,722 B2 | 5/2015 | Patil et al. | | |
| 9,676,667 B2 | 6/2017 | Kalliola et al. | | |
| 2022/0298355 A1 * | 9/2022 | Wang | C09B 67/008 | |
| 2022/0298590 A1 * | 9/2022 | Poles | C14C 3/22 | |
| 2023/0108150 A1 * | 4/2023 | Alkhalaf | C04B 28/06 | 166/292 |

FOREIGN PATENT DOCUMENTS

| | | | | |
|---|---|---|---|---|
| EP | 1028096 A2 | 8/2000 | | |
| GB | 2279655 A | 1/1995 | | |
| WO | WO-2013178059 A1 * | 12/2013 | H01M 4/366 | |

OTHER PUBLICATIONS

Yasuyuki Matsushita; "Conversion of technical lignins to functional materials with retained polymeric properties"; J Wood Sci (2015) 61:230-250; Nov. 29, 2014.

Zhor J Ed—Jiri Zhor; "Molecular structure and performance of lignosulfonates in cement-water systems"; The University of New Brunswick, Doctor of Philosophy; Jan. 1, 2005.

ISR-WO dated Jun. 20, 2024 for related matter PCT/US2024/014825.

Al-Yami, Abdullah et al. "Chemical Additives for Oil Well Cementing." Research and Reviews: Journal of Chemistry 6 (2017): 1-14.

* cited by examiner

COMPOSITIONS AND METHODS FOR BRANCHED CALCIUM LIGNOSULFONATE CEMENT DISPERSANTS

CROSS-REFERENCE

The present disclosure is a divisional application of U.S. application Ser. No. 18/166,343, which was filed on Feb. 8, 2023, and which is hereby incorporated by reference in its entirety.

FIELD OF THE DISCLOSURE

The present disclosure relates generally to cement slurries and, more particularly to, cement dispersants used in cement slurries.

BACKGROUND OF THE DISCLOSURE

Cement slurries are frequently used in the oil and gas industry for primary, remedial, squeeze, and plug cementing applications. The cement slurries should be able to consistently withstand a wide range of temperatures and conditions, as oil and gas wells may be located in various diverse locations. Adequate hardening of a cement slurry is important to the strength and performance of the set cement composition, also referred to as concrete. However, conventional cement slurries may have poor flow due to the viscous nature of the slurries, leading to difficulties when handling or pumping the cement slurry. A viscous cement slurry may require high surface pumping pressures and power to sufficiently pump the slurry into the well, resulting in increased forces exerted on formations and high operating costs.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a composition may include a calcium lignosulfonate salt having a chemical structure (I), wherein a total number of syringyl groups is 2 to 10, an alcohol, an aldehyde, and water.

(I)

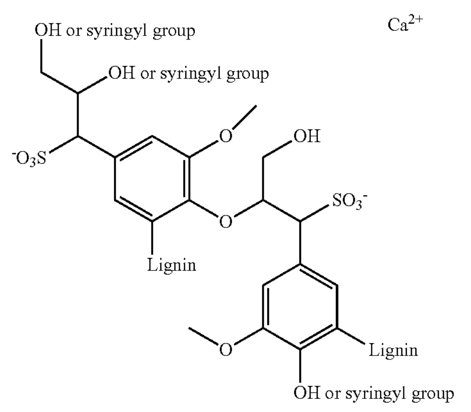

In another embodiment, a cement slurry may include a cement, water, and a lignosulfonate-based cement dispersant comprising a calcium lignosulfonate salt having a chemical structure (I), an alcohol, an aldehyde, and water, wherein a total number of syringyl groups in the chemical structure (I) is 2 to 10.

In a further embodiment, a method may include introducing a cement slurry into a wellbore penetrating a subterranean formation, wherein the cement slurry comprises a lignosulfonate-based cement dispersant, a cement, and water, and allowing the cement slurry to set to a concrete in a downhole zone of interest. The lignosulfonate-based cement dispersant may include a calcium lignosulfonate salt having a chemical structure (I), an alcohol, an aldehyde, and water, wherein a total number of syringyl groups in the chemical structure (I) is 2 to 10.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

Figure 1:
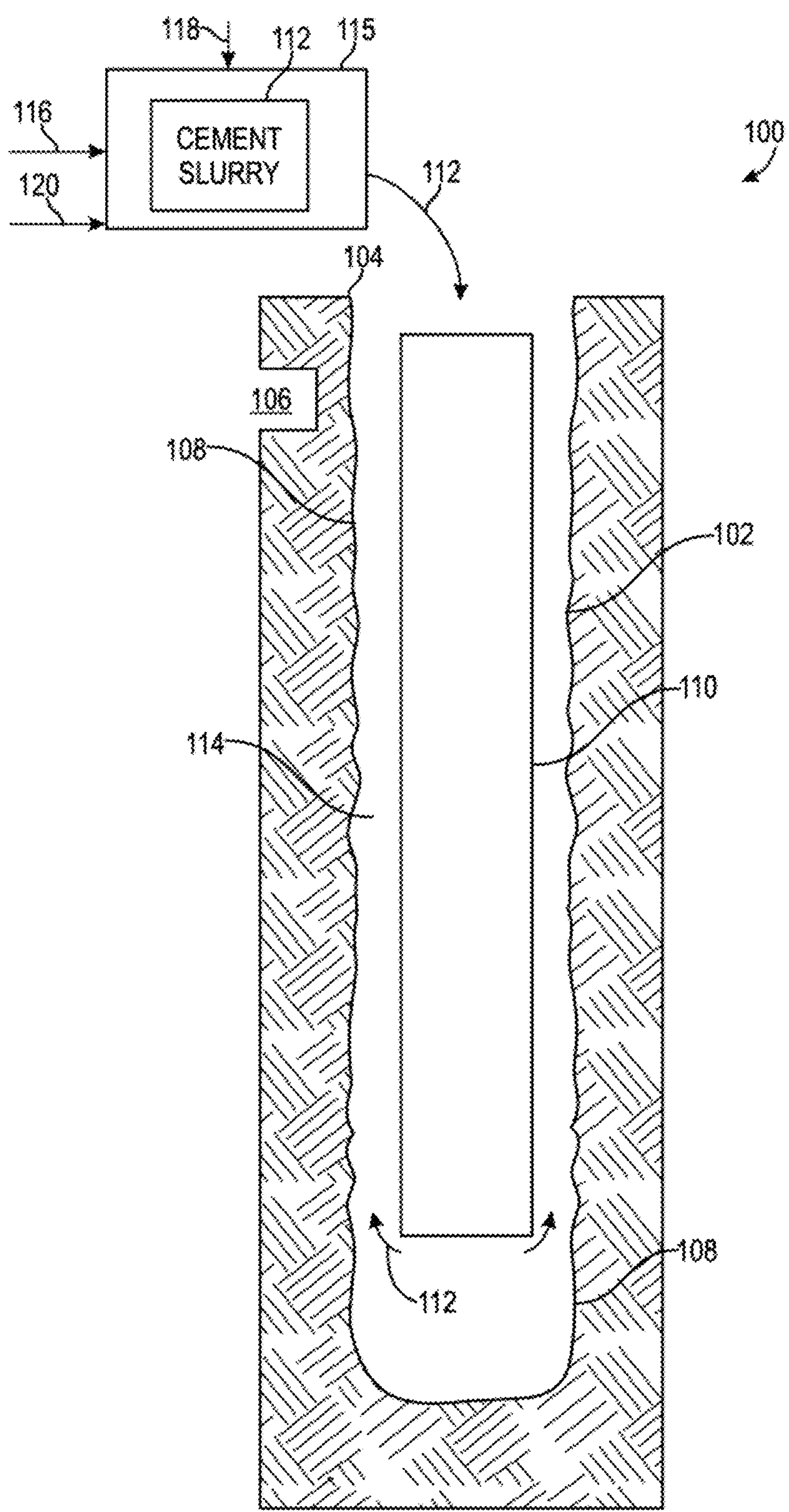
FIG. 1 illustrates a method of cementing.

Embodiments of the present disclosure will now be described in detail with reference to the accompanying Figures. Like elements in the various figures may be denoted by like reference numerals for consistency. Further, in the following detailed description of the embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to cement slurries and, more particularly to, cement dispersants used in cement slurries. Cement dispersants are common components of cement slurries used to improve the rheological properties of the slurry. Primarily, cement dispersants are used to lower the frictional pressures of cement slurries while the slurry is pumped into a well, thus reducing the power required by the cement pumps. The reduction in pressure exertion is achieved by deflocculating, or reducing the viscosity, of the cement slurry by the dispersants. Typical cement dispersants include polyunsulfonated naphthalene, polynaphthalene sulfonate, polymelamine sulfonate, polycarboxylates, and hydroxycarboxylic acids. Additionally, lignosulfonates are also frequently used as cement dispersants.

Lignosulfonates are water-soluble polymer byproducts recovered from the spent pulping liquids of the sulfite wood pulping process. Non-toxic, non-corrosive, and biodegradable, lignosulfonates have been implemented in a wide variety of applications. When used as cement dispersants, lignosulfonates simultaneously lower the viscosity of the cement slurry while reducing the amount of water necessary for forming the slurry, resulting in a stronger concrete once set.

However, conventional lignosulfonate-based cement dispersants have been demonstrated to act as retarders in cement slurries at low temperatures. Consequently, lignosulfonates have been underutilized in cold cementing applications. The present disclosure describes lignosulfonates that are stable and exhibit low weight loss over a large range of temperatures. The temperature-stable lignosulfonates may be used as cement dispersants in cementing applications over a wider range of temperatures than conventional lignosulfonates.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains," "containing," "includes," "including," "comprises," and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

As used herein, "cement dispersants" refer to materials or mixtures used to improve the rheological properties of cement slurries.

As used herein, a "cement slurry" refers to a composition comprising a cement and water. Cement slurries may additionally comprise one or more additives and/or cement dispersants.

Lignosulfonate-based cement dispersant compositions and related cement slurry compositions and related cementing methods are described herein. Generally, lignosulfonates have both syringyl (S) units groups and guaiacyl (G) unit groups as illustrated in Formula 1 below.

Formula 1

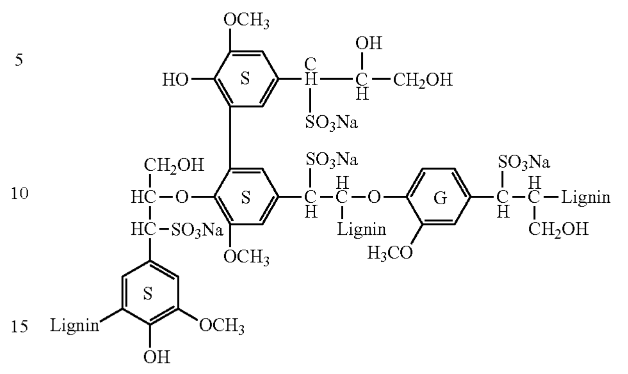

In contrast, the lignosulfonate-based cement dispersant described herein includes a calcium lignosulfonate salt composed primarily syringyl (S) groups and no guaiacyl (G) groups. That is, the lignosulfonate-based cement dispersant described herein may comprise a calcium lignosulfonate salt having a syringyl (S) group while lacking guaiacyl (G) groups. For example, Formula 2 illustrates a calcium lignosulfonate salt having two syringyl (S) groups while lacking a guaiacyl (G) group.

Formula 2

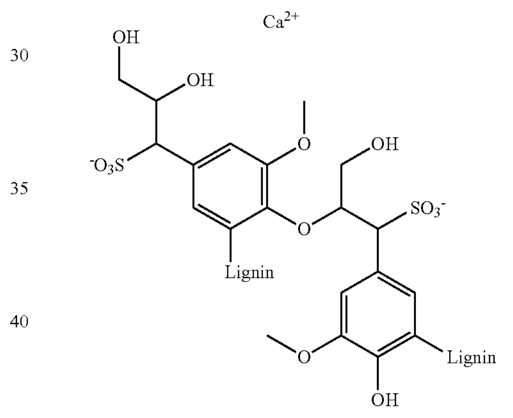

Figure 2:
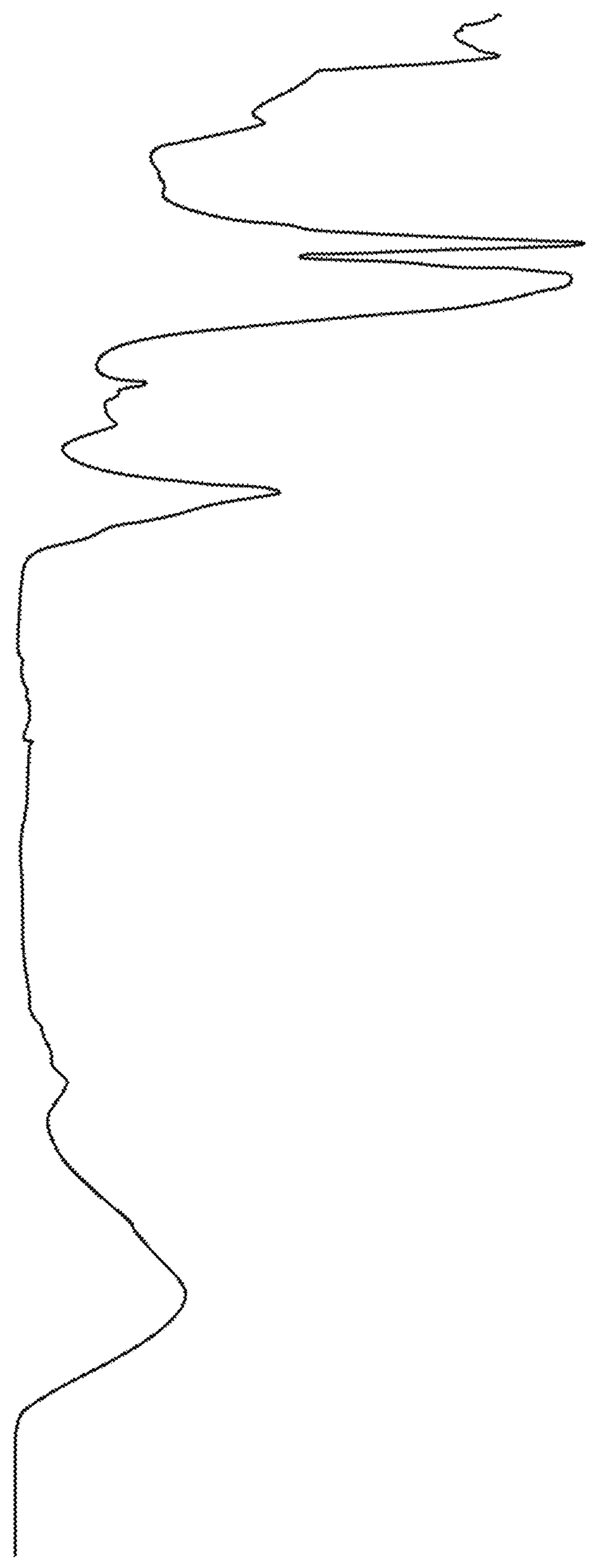
FIG. 2 is a stacked FTIR spectrum of a control lignosulfonate.
Figure 2:
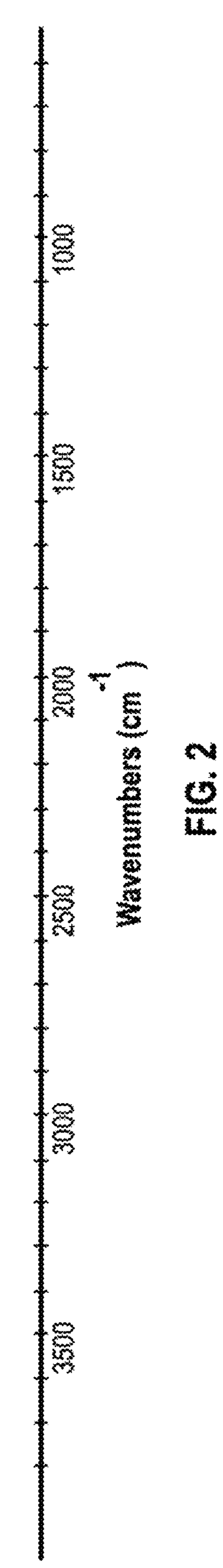

More generally, the lignosulfonate-based cement dispersant described herein may be a calcium lignosulfonate salt according to Formula 3 where the number of syringyl (S) groups may range from 2 (e.g., as illustrated in FIG. 2) to 10.

Formula 3

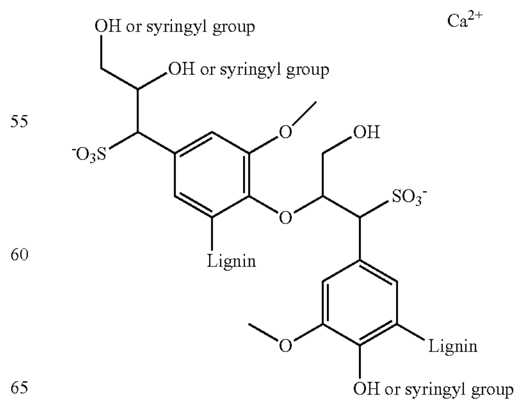

The calcium lignosulfonate salt described herein is a branched chemical structure with less sulfonic groups than calcium lignosulfonate salts with guaiacyl (G) groups incorporated therein.

The lignosulfonate-based cement dispersants described herein may comprise a calcium lignosulfonate salt, water, alcohol, and formaldehyde.

Calcium lignosulfonate salt described herein may, for example, be present in the lignosulfonate-based cement dispersant described herein at a concentration of about 10 wt % to about 30 wt % (or about 10 wt % to about 15 wt %, or about 10 wt % to about 20 wt %, or about 15 wt % to about 20 wt %, or about 15 wt % to about 25 wt %, or about 20 wt % to about 25 wt %, or about 20 wt % to about 30 wt %, or about 25 wt % to about 30 wt %), based on the total weight of the lignosulfonate-based cement dispersant.

Alcohols suitable for use in the lignosulfonate-based cement dispersants described herein may include, but are not limited to, methanol, ethanol, propanol, iso-butanol, t-butanol, the like, and any combination thereof. The concentration of alcohol in the lignosulfonate-based cement dispersant may, for example, be about 0.1 wt % to about 4 wt % (or about 0.1 wt % to about 3 wt %, or about 0.1 wt % to about 2 wt %, or about 0.1 wt % to about 1 wt %, or about 1 wt % to about 4 wt %, or about 1 wt % to about 3 wt %, or about 1 wt % to about 2 wt %, or about 2 wt % to about 4 wt %, or about 2 wt % to about 3 wt %, or about 3 wt % to about 4 wt %) based on the total weight of the lignosulfonate-based cement dispersant.

Aldehydes suitable for the use in the compositions and methods of the present disclosure may include, but are not limited to, formaldehyde, acetaldehyde, propanal, butanal, the like, and any combination thereof. The aldehyde concentration in the lignosulfonate-based cement dispersant may, for example, be about 0.1 wt % to about 4 wt % (or about 0.1 wt % to about 3 wt %, or about 0.1 wt % to about 2 wt %, or about 0.1 wt % to about 1 wt %, or about 1 wt % to about 4 wt %, or about 1 wt % to about 3 wt %, or about 1 wt % to about 2 wt %, or about 2 wt % to about 4 wt %, or about 2 wt % to about 3 wt %, or about 3 wt % to about 4 wt %) based on the total weight of the lignosulfonate-based cement dispersant.

Water may be the balance of the lignosulfonate-based cement dispersant.

The specific gravity of the lignosulfonate-based cement dispersants described herein may be comparable to the specific gravities of conventional lignosulfonate-based cement dispersants. For example, the specific gravity of the lignosulfonate-based cement dispersant may be about 1 $g/cm^3$ to about 1.4 $g/cm^3$ (or about 1 $g/cm^3$ to about 1.3 $g/cm^3$, or about 1 $g/cm^3$ to about 1.2 $g/cm^3$, or about 1 $g/cm^3$ to about 1.1 $g/cm^3$, or about 1.1 $g/cm^3$ to about 1.4 $g/cm^3$, or about 1.1 $g/cm^3$ to about 1.3 $g/cm^3$, or about 1.1 $g/cm^3$ to about 1.2 $g/cm^3$, or about 1.2 $g/cm^3$ to about 1.4 $g/cm^3$, or about 1.2 $g/cm^3$ to about 1.3 $g/cm^3$, or about 1.3 $g/cm^3$ to about 1.4 $g/cm^3$).

The lignosulfonate-based cement dispersants described herein may be combined with a cement and water to form a cement slurry. The lignosulfonate-based cement dispersants may be present in the cement slurry at about 0.1 wt % to about 2 wt % of the cement slurry (or about 0.1 wt % to about 1.5 wt %, or about 0.1 wt % to about 1 wt %, or about 0.1 wt % to about 0.5 wt %, or about 0.5 wt % to about 2 wt %, or about 0.5 wt % to about 1.5 wt %, or about 0.5 wt % to about 1 wt %, or about 1 wt % to about 2 wt %, or about 1 wt % to about 1.5 wt %, or about 1.5 wt % to about 2 wt %), based on the total weight of the cement slurry.

The cement may be a hydraulic or a non-hydraulic cement. A hydraulic cement may refer to a mixture of limestone, clay, and gypsum burned together under extreme temperatures that may begin to set instantly or within a few minutes while in contact with water. A non-hydraulic cement may refer to a mixture of lime, gypsum, plasters, and oxychloride. A non-hydraulic cement may take longer to set or may require drying conditions for proper strengthening. A hydraulic or non-hydraulic cement may be chosen based on the desired application of the cement slurry of the present disclosure. For example, the cement may be a hydraulic cement, such as Class G Portland cement, used for primary cementing. The concentration of the cement in the cement slurry may, for example, be about 30 wt % to about 60 wt % (or about 30 wt % to about 50 wt %, or about 30 wt % to about 40 wt %, or about 40 wt % to about 60 wt %, or about 40 wt % to about 50 wt %, or about 50 wt % to about 60 wt %), based on the total weight of the cement slurry.

The water of the cement slurry may be distilled water, deionized water, tap water, or any combination thereof. Similarly, the water may contain additional components and/or contaminants, and may, for example, be sourced from freshwater, seawater, natural brine, synthetic brine, salt water, or any combination thereof. Salt or organic compounds may be incorporated into the water to control certain properties of the water, such as density. Without being bound by any particular theory, increasing the saturation of water by increasing the salt concentration or the level of other organic compounds in the water may increase the density of the water, and thus, the cement slurry. Suitable salts may include, but are not limited to, alkali metal chlorides, hydroxides, carboxylates, the like, and any combination thereof. Moreover, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, the like, and any combination thereof.

The cement slurry may, for example, have a water concentration of about 10 wt % to about 30 wt % (or about 10 wt % to about 25 wt %, or about 10 wt % to about 20 wt %, or about 10 wt % to about 15 wt %, or about 15 wt % to about 30 wt %, or about 15 wt % to about 25 wt %, or about 15 wt % to about 20 wt %, or about 20 wt % to about 30 wt %, or about 20 wt % to about 25 wt %, or about 25 wt % to about 30 wt %), based on the total weight of the cement slurry.

The density of the cement slurry may, for example, be about 2 $g/cm^3$ to about 3 $g/cm^3$ (or about 2 $g/cm^3$ to about 2.8 $g/cm^3$, or about 2 $g/cm^3$ to about 2.6 $g/cm^3$, or about 2 $g/cm^3$ to about 2.4 $g/cm^3$, or about 2 $g/cm^3$ to about 2.2 $g/cm^3$, or about 2.2 $g/cm^3$ to about 3 $g/cm^3$, or about 2.2 $g/cm^3$ to about 2.8 $g/cm^3$, or about 2.2 $g/cm^3$ to about 2.6 $g/cm^3$, or about 2.2 $g/cm^3$ to about 2.4 $g/cm^3$, or about 2.4 $g/cm^3$ to about 3 $g/cm^3$, or about 2.4 $g/cm^3$ to about 2.8 $g/cm^3$, or about 2.4 $g/cm^3$ to about 2.6 $g/cm^3$, or about 2.6 $g/cm^3$ to about 3 $g/cm^3$, or about 2.6 $g/cm^3$ to about 2.8 $g/cm^3$, or about 2.8 $g/cm^3$ to about 3 $g/cm^3$) at 25° C.

One or more cement additives may be introduced to the cement slurry. The one or more cement additives may be any additives known to be suitable for cement slurries. As non-limiting examples, suitable cement additives may include strength-stabilizing agents, expansion additives, weighting agents, defoamers, gelling agents, retarders, the like, and any combination thereof.

Strength-stabilizing agents may be added to the cement slurry to reduce the permeability and improve the compressive strength of a set concrete. Without being bound by any particular theory, the presence of a strength-stabilizing agent in the cement slurry may lower the occurrence of cement sedimentation by increasing the shear viscosity of the slurry. An example of a strength-stabilizing agent may be silica flour. The concentration of the strength-stabilizing agent in the cement slurry may, for example, be about 10 wt % to about 20 wt % (or about 10 wt % to about 18 wt %, or about 10 wt % to about 16 wt %, or about 10 wt % to about 14 wt %, or about 10 wt % to about 12 wt %, or about 12 wt % to about 20 wt %, or about 12 wt % to about 18 wt %, or about 12 wt % to about 16 wt %, or about 12 wt % to about 14 wt %, or about 14 wt % to about 20 wt %, or about 14 wt % to about 18 wt %, or about 14 wt % to about 16 wt %, or about 16 wt % to about 20 wt %, or about 16 wt % to about 18 wt %, or about 18 wt % to about 20 wt %), based on the total weight of the cement slurry.

Expansion additives may reduce the shrinkage of a set concrete, thereby decreasing the likelihood of concrete cracking and/or microchanneling. Suitable expansion additives may include, but are not limited to, calcium sulfoaluminate, calcium oxide, magnesium oxide, iron filings, aluminum powder, composites, the like, and any combination thereof. The concentration of the expansion additive in the cement slurry may, for example, be about 0.1 wt % to about 1 wt % (or about 0.1 wt % to about 0.8 wt %, or about 0.1 wt % to about 0.6 wt %, or about 0.1 wt % to about 0.4 wt %, or about 0.1 wt % to about 0.2 wt %, or about 0.2 wt % to about 1 wt %, or about 0.2 wt % to about 0.8 wt %, or about 0.2 wt % to about 0.6 wt %, or about 0.2 wt % to about 0.4 wt %, or about 0.4 wt % to about 1 wt %, or about 0.4 wt % to about 0.8 wt %, or about 0.4 wt % to about 0.6 wt %, or about 0.6 wt % to about 1 wt %, or about 0.6 wt % to about 0.8 wt %, or about 0.8 wt % to about 1 wt %), based on the total weight of the cement slurry.

The density of the cement slurry may be increased by the addition of a weighting agent. For example, hematite, ilmenite, hausmannite, barite, or any combination thereof, may be added to the cement slurry due to the high specific gravity of the minerals. The concentration of the weighting agent in the cement slurry may, for example, be about 10 wt % to about 20 wt % (or about 10 wt % to about 18 wt %, or about 10 wt % to about 16 wt %, or about 10 wt % to about 14 wt %, or about 10 wt % to about 12 wt %, or about 12 wt % to about 20 wt %, or about 12 wt % to about 18 wt %, or about 12 wt % to about 16 wt %, or about 12 wt % to about 14 wt %, or about 14 wt % to about 20 wt %, or about 14 wt % to about 18 wt %, or about 14 wt % to about 16 wt %, or about 16 wt % to about 20 wt %, or about 16 wt % to about 18 wt %, or about 18 wt % to about 20 wt %), based on the total weight of the cement slurry.

Defoamers may be added to the cement slurry to decrease foam formation by at least partially preventing air entrainment in the slurry. Lower foam formation in the cement slurry may aid in density control and slurry mixing efficiency. Defoamers suitable for use in the cement slurry compositions and methods of the present disclosure may be insoluble oils, waxes, silicones, alkyl polyacrylates, or any combination thereof. Examples of insoluble oils may include, but are not limited to, mineral oil, vegetable oil, white oil, the like, and any combination thereof. Examples of waxes may include, but are not limited to, ethylene bis stearamide (EBS), paraffin waxes, ester waxes, fatty alcohol waxes, the like, and any combination thereof. Examples of silicones may include, but are not limited to, silicone glycols, fluorosilicones, the like, and any combination thereof. The concentration of the defoamer in the cement slurry may, for example, be about 0.001 wt % to about 0.1 wt % (or about 0.001 wt % to about 0.05 wt %, or about 0.001 wt % to about 0.01 wt %, or about 0.001 wt % to about 0.005 wt %, or about 0.005 wt % to about 0.1 wt %, or about 0.005 wt % to about 0.05 wt %, or about 0.005 wt % to about 0.01 wt %, or about 0.01 wt % to about 0.1 wt %, or about 0.01 wt % to about 0.05 wt %, or about 0.05 wt % to about 0.1 wt %).

The addition of a gelling agent to the cement slurry may improve the suspension of solids in the slurry. Example gelling agents may include, but are not limited to, polyurethanes, acrylic polymers, latex, styrene/butadiene, polyvinyl alcohol, clays, cellulosics, sulfonates, gums (e.g., guar, xanthan, cellulose, locust bean, and acacia), saccharides (e.g., carrageenan, pullulan, konjac, and alginate), proteins (e.g., casein, collagen, and albumin), modified castor oil, organosilicones (e.g., silicone resins, dimethicones, and modified silicones), the like, and any combination thereof. The concentration of the gelling agent in the cement slurry may, for example, be about 0.01 wt % to about 1 wt % (or about 0.01 wt % to about 0.5 wt %, or about 0.01 wt % to about 0.1 wt %, or about 0.01 wt % to about 0.05 wt %, or about 0.05 wt % to about 1 wt %, or about 0.05 wt % to about 0.5 wt %, or about 0.05 wt % to about 0.1 wt %, or about 0.1 wt % to about 1 wt %, or about 0.1 wt % to about 0.5 wt %, or about 0.5 wt % to about 1 wt %), based on the total weight of the cement slurry.

Retarders may be added to the cement slurry to extend the thickening time of the slurry. Example retarders may include, but are not limited to, conventional lignosulfonates, cellulose derivatives (e.g., hydroxyethyl cellulose and carboxymethyl hydroxyethyl cellulose), hydroxycarboxylic acids (e.g., citric acid, tartaric acid, gluconic acid, glucoheptonate, and glucono-delta-lactone), organophosphates, maleic anhydride, 2-acrylamido-2-methylpropanesulfonic acid copolymers, borax, boric acid, zinc oxide, the like, and any combination thereof. The concentration of the retarder in the cement slurry may, for example, be about 0.1 wt % to about 1 wt % (or about 0.1 wt % to about 0.8 wt %, or about 0.1 wt % to about 0.6 wt %, or about 0.1 wt % to about 0.4 wt %, or about 0.1 wt % to about 0.2 wt %, or about 0.2 wt % to about 1 wt %, or about 0.2 wt % to about 0.8 wt %, or about 0.2 wt % to about 0.6 wt %, or about 0.2 wt % to about 0.4 wt %, or about 0.4 wt % to about 1 wt %, or about 0.4 wt % to about 0.8 wt %, or about 0.4 wt % to about 0.6 wt %, or about 0.6 wt % to about 1 wt %, or about 0.6 wt % to about 0.8 wt %, or about 0.8 wt % to about 1 wt %), based on the total weight of the cement slurry.

Methods of cementing may comprise applying the cement slurry of the present disclosure to a downhole zone of interest. The downhole zone of interest may, for example, be a subterranean formation, an annulus between a wellbore wall and a tubular (e.g., a casing) therein, an annulus between two tubulars (e.g., between two casings), a microannulus, or a combination thereof.

FIG. 1 illustrates a non-limiting example of a cementing method 100 of the present disclosure. FIG. 1 is a well site 100 including a wellbore 102 formed through the Earth surface 104 into a geological formation 106 in the Earth crust. The wellbore 102 is defined by a borehole surface 108 of the formation 106. The wellbore 102 includes a casing 110. In some implementations to cement the casing 110 in place, a cement slurry 112 is pumped down through the casing 110. The cement slurry 112 exits the bottom portion of the casing 110 and then flows upward through the annulus 114 between the casing 110 and the formation 106. The cement slurry 112 is allowed to set in the annulus 114 to cement the casing 110. This cementing of the casing 110 may be labeled as primary cementing. The cement slurries described herein may also be utilized in secondary or remedial cementing operations.

Surface equipment 115 may be associated with the wellbore 102 for drilling the wellbore 102 and installation of the casing 110, and for cementing the annulus 114 between the casing 110 and the formation surface 108. The surface equipment 115 may include a vessel or truck for holding cement slurry 112. The cement slurry 112 may be prepared at the well site 100 or off-site. The cement slurry 112 may be prepared by mixing cement 116, water 118, and cement additive(s) 120. In some implementations, the cement additives 120 may be incorporated into the cement 116 prior to the mixing with the water 118.

The surface equipment 115 may include a mounted drilling rig, which may be a machine that creates boreholes in the Earth subsurface. The term "rig" may refer to equipment employed to penetrate the Earth surface 104 of Earth crust. To form a hole in the ground, a drill string having a drill bit may be lowered into the hole being drilled. In operation, the drill bit may rotate to break the rock formations to form the hole as a borehole or wellbore 102. In the rotation, the drill bit may interface with the ground or formation 106 to grind, cut, scrape, shear, crush, or fracture rock to drill the hole. The openhole wellbore having a wall 108 with the formation 106 is drilled and formed through the Earth surface 104 into the hydrocarbon or geological formation 106.

In operation, a drilling fluid (also known as drilling mud) is circulated down the drill string (not shown) to the bottom of the openhole wellbore 102. The drilling fluid may then flow upward toward the surface through an annulus formed between the drill string and the wall 108 of the wellbore 102 as openhole. The drilling fluid may cool the drill bit, apply hydrostatic pressure upon the formation penetrated by the wellbore, and carry formation cuttings to the surface. In addition to the drilling rig, surface equipment 115 may include tanks, separators, pits, pumps, and piping for circulating drilling fluid (mud) through the wellbore.

The casing 110 may be lowered into the wellbore 102 and cement slurry applied to the annulus between the casing 110 and the formation surface 108 of the wellbore 102. Oil-well cementing may include mixing a slurry of cement and water, and pumping the slurry down the casing 110, tubing, or drill pipe to a specified elevation or volume in the well. As indicated, primary cementing may involve casing cementation. Primary cementing may be the cementing that takes place soon after the lowering of the casing 110 into the formation 106 and may involve filling the annulus 114 between the casing 110 and the formation 106 with cement.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Embodiments disclosed herein include:

A. A composition including a calcium lignosulfonate salt having a chemical structure (I), wherein a total number of syringyl groups is 2 to 10; an alcohol; an aldehyde; and water.

(I)

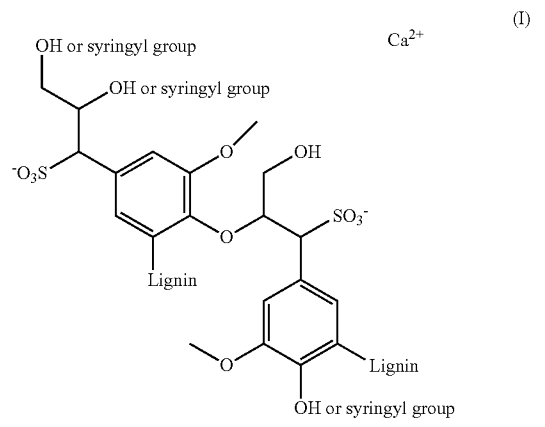

B. A cement slurry including a lignosulfonate-based cement dispersant including a calcium lignosulfonate salt having a chemical structure (I), an alcohol, an aldehyde, and water, wherein a total number of syringyl groups in the chemical structure (I) is 2 to 10; a cement; and water.

C. A method including introducing a cement slurry into a wellbore penetrating a subterranean formation; wherein the cement slurry includes a lignosulfonate-based cement dispersant, a cement and water; wherein the lignosulfonate-based cement dispersant includes a calcium lignosulfonate salt having a chemical structure (I), an alcohol, an aldehyde, and water, wherein a total number of syringyl groups in the chemical structure (I) is 2 to 10; and allowing the cement slurry to set to a concrete in a downhole zone of interest.

Each of embodiments A, B, and C may have one or more of the following additional elements in any combination: Element 1: wherein a specific gravity is about 1 g/cm$^3$ to about 1.4 g/cm$^3$ at 25° C. Element 2: wherein the alcohol is methanol. Element 3: wherein the aldehyde is formaldehyde. Element 4: wherein a concentration of the calcium lignosulfonate salt is about 10 wt % to about 30 wt %, based on the weight of the composition. Element 5: wherein a concentration of the alcohol is about 0.1 wt % to about 4 wt %, based on the weight of the composition. Element 6: wherein a concentration of the aldehyde is about 0.1 wt % to about 4 wt %, based on the weight of the composition. Element 7: further comprising a strength-stabilizing agent, an expansion additive, a weighting agent, a defoamer, a gelling agent, a retarder, or any combination thereof. Element 8: wherein a concentration of the strength-stabilizing agent is about 10 wt % to about 20 wt %, based on the weight of the cement slurry. Element 9: wherein a concentration of the expansion additive is 0.1 wt % to about 1 wt %, based on the weight of the cement slurry. Element 10: wherein a concentration of the weighting agent is about 10 wt % to about 20 wt %, based on the weight of the cement slurry. Element 11: wherein a concentration of the defoamer is about 0.001 wt % to about 0.1 wt %, based on the weight of the cement slurry. Element 12: wherein a concentration of the gelling agent is about 0.01 wt % to about 1 wt %, based on the weight of the cement slurry. Element 13: wherein a concentration of the retarder is about 0.1 wt % to about 1 wt %, based on the weight of the cement slurry. Element 14: wherein a density of the cement slurry is about 2 g/cm$^3$ to about 3 g/cm$^3$ at 25° C. Element 15: wherein a specific gravity of the lignosulfonate-based cement dispersant is about 1 g/cm$^3$ to about 1.4 g/cm$^3$ at 25° C. Element 16: wherein a concentration of the calcium lignosulfonate salt is about 10 wt % to about 30 wt %, based on the weight of the lignosulfonate-based cement dispersant. Element 17: wherein a concentration of the alcohol is about 0.1 wt % to about 4 wt %, based on the weight of the lignosulfonate-based cement dispersant. Element 18: wherein a concentration of the aldehyde is about 0.1 wt % to about 4 wt %, based on the weight of the lignosulfonate-based cement dispersant. Element 19: wherein a concentration of the lignosulfonate-based cement dispersant is about 0.1 wt % to about 2 wt %, based on the weight of the cement slurry. Element 20: wherein a concentration of the cement is about 30 wt % to about 60 wt %, based on the weight of the cement slurry. Element 21: wherein a concentration of the water is about 10 wt % to about 30 wt %, based on the weight of the cement slurry.

By way of non-limiting example, exemplary combinations applicable to A, B, and C include: Element 1 with Element 2; Element 1 with Element 2; Element 1 with Element 3; Element 1 with Element 4; Element 1 with Element 5; Element 1 with Element 6; Element 2 with Element 3; Element 2 with Element 4; Element 2 with Element 5; Element 2 with Element 6; Element 3 with Element 4; Element 3 with Element 5; Element 3 with Element 6; Element 4 with Element 5; Element 4 with Element 6; Element 5 with Element 6; Element 7 with Element 8; Element 7 with Element 9; Element 7 with Element 10; Element 7 with Element 11; Element 7 with Element 12; Element 7 with Element 13; Element 7 with Element 14; Element 7 with Element 15; Element 7 with Element 16; Element 7 with Element 17; Element 7 with Element 18; Element 7 with Element 19; Element 7 with Element 20; Element 7 with Element 21; Element 8 with Element 9; Element 8 with Element 10; Element 8 with Element 11; Element 8 with Element 12; Element 8 with Element 13; Element 8 with Element 14; Element 8 with Element 15; Element 8 with Element 16; Element 8 with Element 17; Element 8 with Element 18; Element 8 with Element 19; Element 8 with Element 20; Element 8 with Element 21; Element 9 with Element 10; Element 9 with Element 11; Element 9 with Element 12; Element 9 with Element 13; Element 9 with Element 14; Element 9 with Element 15; Element 9 with Element 16; Element 9 with Element 17; Element 9 with Element 18; Element 9 with Element 19; Element 9 with Element 20; Element 9 with Element 21; Element 10 with Element 11; Element 10 with Element 12; Element 10 with Element 13; Element 10 with Element 14; Element 10 with Element 15; Element 10 with Element 16; Element 10 with Element 17; Element 10 with Element 18; Element 10 with Element 19; Element 10 with Element 20; Element 10 with Element 21; Element 11 with Element 12; Element 11 with Element 13; Element 11 with Element 14; Element 11 with Element 15; Element 11 with Element 16; Element 11 with Element 17; Element 11 with Element 18; Element 11 with Element 19; Element 11 with Element 20; Element 11 with Element 21; Element 12 with Element 13; Element 12 with Element 14; Element 12 with Element 15; Element 12 with Element 16; Element 12 with Element 17; Element 12 with Element 18; Element 12 with Element 19; Element 12 with Element 20; Element 12 with Element 21; Element 13 with Element 14; Element 13 with Element 15; Element 13 with Element 16; Element 13 with Element 17; Element 13 with Element 18; Element 13 with Element 19; Element 13 with Element 20; Element 13 with Element 21; Element 14 with Element 15; Element 14 with Element 16; Element 14 with Element 17; Element 14 with Element 18; Element 14 with Element 19; Element 14 with Element 20; Element 14 with Element 21; Element 15 with Element 16; Element 15 with Element 17; Element 15 with Element 18; Element 15 with Element 19; Element 15 with Element 20; Element 15 with Element 21; Element 16 with Element 17; Element 16 with Element 18; Element 16 with Element 19; Element 16 with Element 20; Element 16 with Element 21; Element 17 with Element 18; Element 17 with Element 19; Element 17 with Element 20; Element 17 with Element 21; Element 18 with Element 19; Element 18 with Element 20; Element 18 with Element 21; Element 19 with Element 20; Element 19 with Element 21; Element 20 with Element 21.

EXAMPLES

The chemical structures of an experimental calcium lignosulfonate salt and control lignosulfonate (CFR-3™, Halliburton Company) were analyzed by FTIR and $^1$H NMR spectroscopy. FTIR spectra were acquired using an FTIR spectrophotometer equipped with a mercury cadmium telluride (MCT) detector and GOLDEN GATE™ accessory with an average of 128 scans at a resolution of 4 cm$^{-1}$. $^1$H NMR spectra were acquired using a 500 MHz NMR spectrometer equipped with a 5 mm liquids probe.

Figure 3:
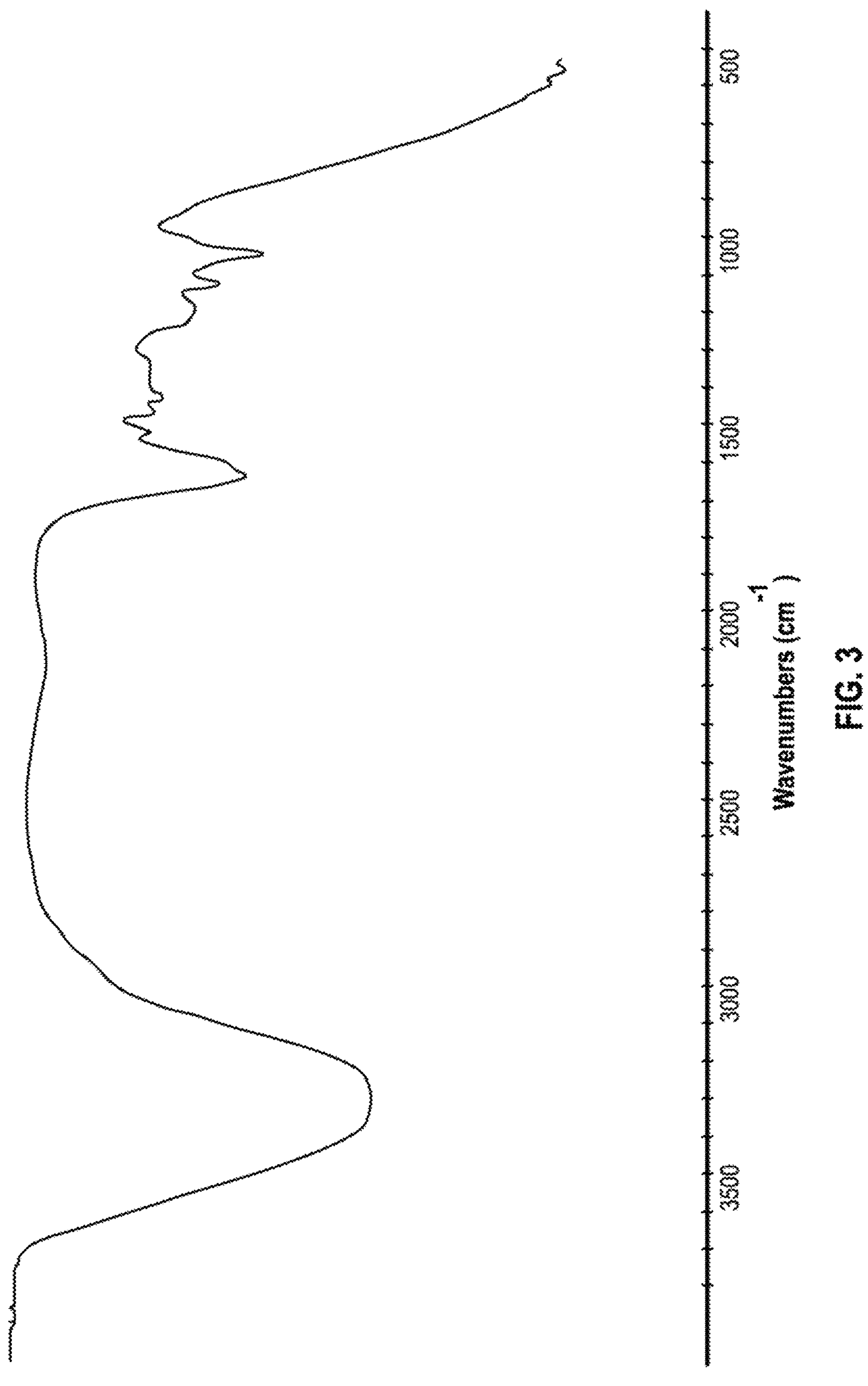
FIG. 3 is a stacked FTIR spectrum of an experimental calcium lignosulfonate salt.
Figure 4:
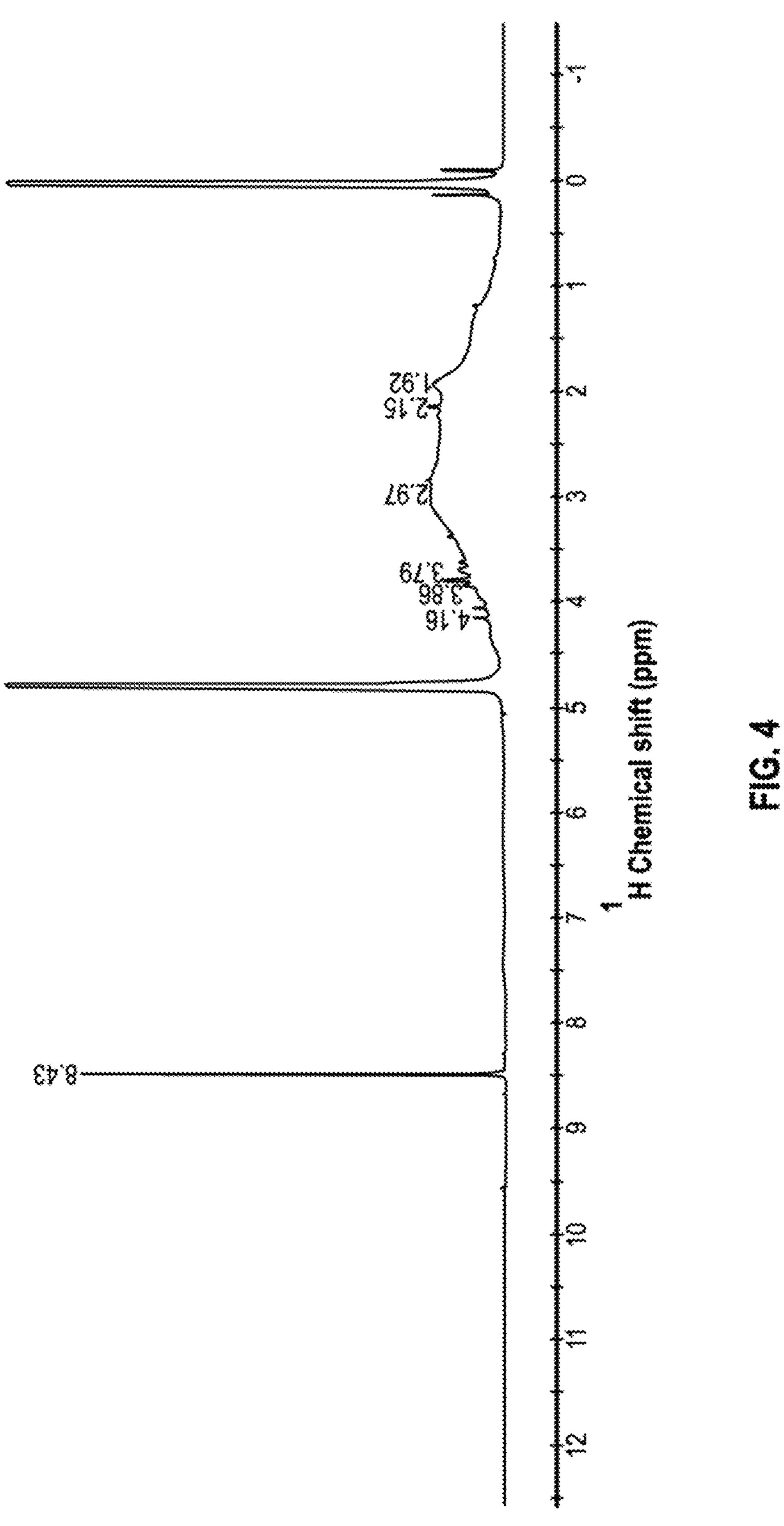
FIG. 4 is a $^1$H NMR spectrum of the control lignosulfonate.
Figure 5:
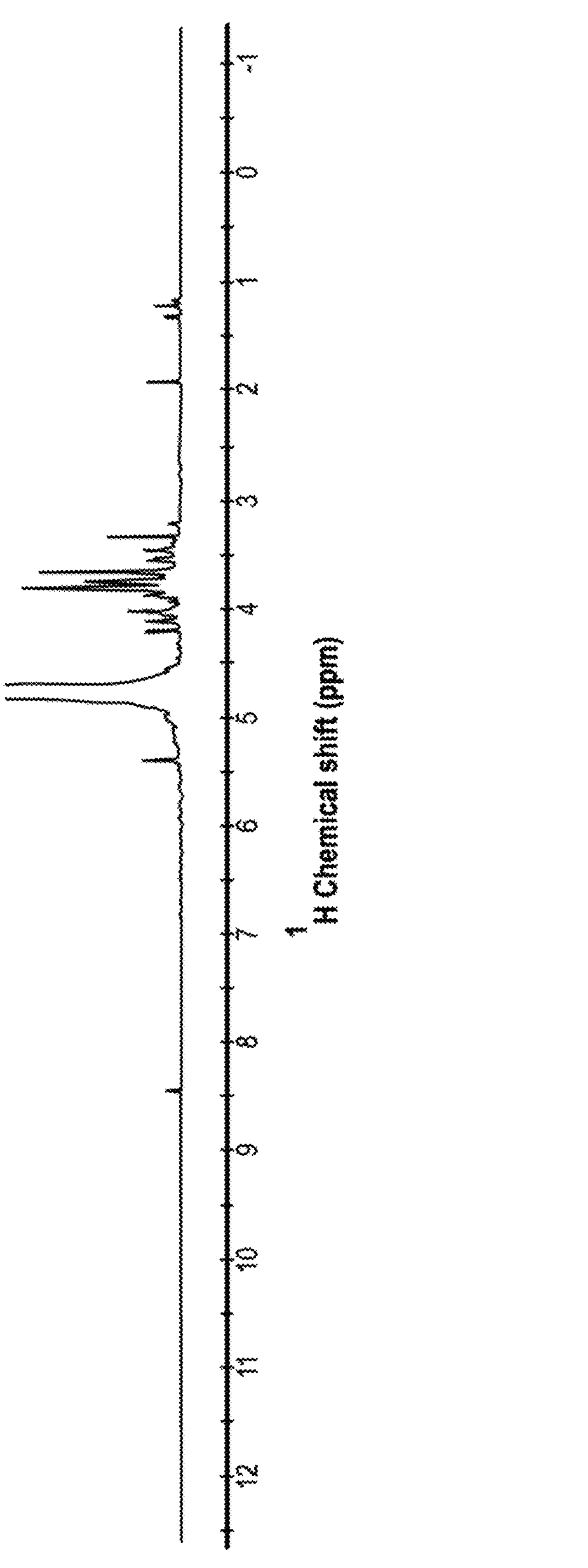
FIG. 5 is a $^1$H NMR spectrum of the experimental calcium lignosulfonate salt.

FIGS. 2 and 3 are the FTIR spectra of the control lignosulfonate and the experimental calcium lignosulfonate, respectively. Both spectra show peaks due to O—H stretching from phenolic and aliphatic structures (3000 cm$^{-1}$-3436 cm$^{-1}$), CH vibrations from —$CH_3$, —$CH_2$, and $CH_3O$— (2850 cm$^{-1}$-2950 cm$^{-1}$), C═O vibration from conjugated p-substituted aryl ketones (1645 cm$^{-1}$), syringyl group stretching (1086 cm$^{-1}$), and S═O stretching (1000 cm$^{-1}$-1046 cm$^{-1}$). However, FIG. 3, unlike FIG. 2, does not show a peak due to guaiacyl group stretching (1142 cm$^{-1}$), indicating that the experimental calcium lignosulfonate slat does not contain any guaiacyl groups. The lack of guaiacyl groups is further demonstrated in the $^1$H NMR spectra of the control lignosulfonate and experimental calcium lignosulfonate salt (FIGS. 4 and 5, respectively). FIG. 5 does not show any peaks between 6.80 ppm and 7.20 ppm correlating to $H^2$, $H^5$, and $H^6$ found in guaiacyl groups. Moreover, the control lignosulfonate spectrum (FIG. 4) has a peak at not only 9.5 ppm correlating to formaldehyde, but also at 2.15 ppm correlating to acetone, indicating that the control lignosulfonate is the condensation product of formaldehyde, acetone, and an alkali metal sulfite.

Figure 6:
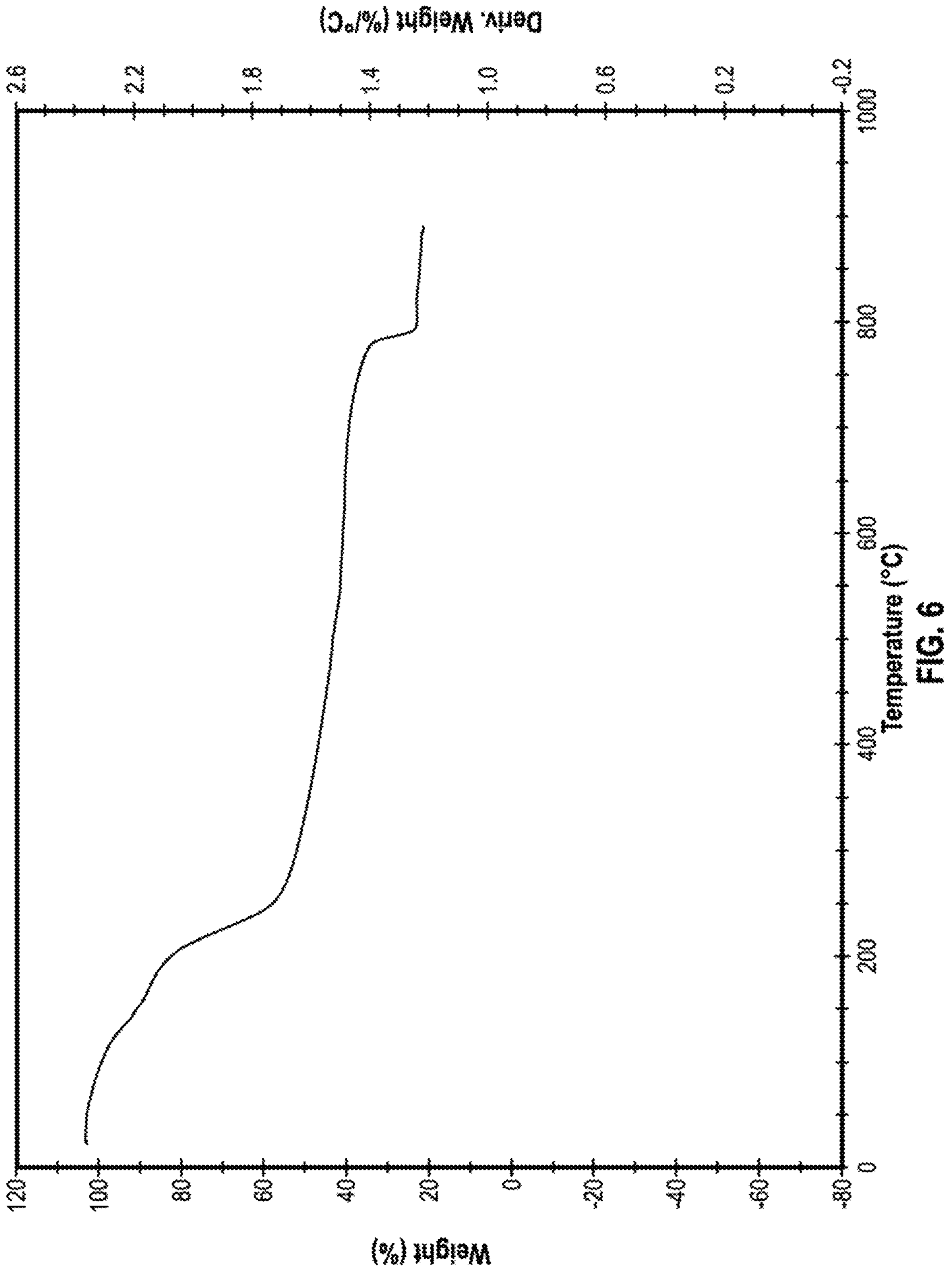
FIG. 6 is a thermogravimetric analysis spectrum of the experimental cement dispersant.

The thermal stability of the experimental calcium lignosulfonate salt was analyzed by thermogravimetric analysis (TGA). FIG. 6 shows the TGA spectrum of the experimental calcium lignosulfonate salt. Between 0° C. and 400° C., the experimental calcium lignosulfonate salt experienced less than a 50% change in weight, demonstrating excellent thermal stability within this temperature range.

The rheologies of cement slurries prepared with cement dispersants containing formaldehyde, methanol, and either the experimental calcium lignosulfonate salt (experimental dispersant) or the control lignosulfonate (control dispersant)

were analyzed. The compositions of the experimental slurry and the control slurry are given in Tables 1 and 2, respectively.

TABLE 1

| Component | Concentration [wt %] |
|---|---|
| Experimental dispersant | 0.51 |
| Cement (Portland Class G) | 46.51 |
| Drill water | 19.65 |
| Strength-stabilizing agent (SSA-2 ™) | 16.28 |
| Expansion additive (MICROBOND HT ™) | 0.47 |
| Weighting agent (HI-DENSE NO. 4 ™) | 16.28 |
| Defoamer (D-AIR 3000L ™) | <0.01 |
| Gelling agent (WG-17 ™) | 0.02 |
| Retarder (HR-5 ™) | 0.28 |

TABLE 2

| Component | Concentration [wt %] |
|---|---|
| Control dispersant | 0.23 |
| Cement (Portland Class G) | 46.64 |
| Drill water | 19.71 |
| Strength-stabilizing agent (SSA-2 ™) | 16.32 |
| Expansion additive (MICROBOND HT ™) | 0.47 |
| Weighting agent (HI-DENSE NO. 4 ™) | 16.32 |
| Defoamer (D-AIR 3000L ™) | <0.01 |
| Gelling agent (WG-17 ™) | 0.02 |
| Retarder (HR-5 ™) | 0.28 |

SSA-2™, MICROBOND-HT™, HI-DENSE NO. 4™, D-AIR 3000L™, WG-17™, and HR-5™ are commercially available cement additives from Halliburton Company (Houston, TX, USA). The densities of the experimental cement slurry and the control cement slurry were 2.3 $g/cm^3$ and 2.2 $g/cm^3$, respectively.

The viscosity data acquired by a viscometer for the experimental and control cement slurries are given in Tables 3 and 4, respectively.

TABLE 3

| Down | | Up | |
|---|---|---|---|
| Rotational speed [rpm] | Ramp-down | Rotational speed [rpm] | Ramp-up |
| 300 | 269 | 3 | 18 |
| 200 | 192 | 6 | 23 |
| 100 | 105 | 100 | 100 |
| 6 | 20 | 200 | 189 |
| 3 | 16 | 300 | 269 |

TABLE 4

| Down | | Up | |
|---|---|---|---|
| Rotational speed [rpm] | Ramp-down | Rotational speed [rpm] | Ramp-up |
| 300 | 260 | 3 | 8 |
| 200 | 171 | 6 | 11 |
| 100 | 90 | 100 | 87 |
| 6 | 10 | 200 | 190 |
| 3 | 8 | 300 | 279 |

The data in Tables 3 and 4 indicate that the experimental dispersant had a dispersing effect comparable to the commercially available control dispersant.

The invention claimed is:

1. A composition comprising:

an alcohol, an aldehyde, water, and a calcium lignosulfonate salt having 2 to 10 syringyl groups and no guaiacyl groups;

wherein the alcohol is selected from the group consisting of methanol, ethanol, propanol, iso-butanol, t-butanol, and any combination thereof; and wherein the aldehyde is selected from the group consisting of formaldehyde, acetaldehyde, propanal, butanal, and any combination thereof.

2. The composition of claim 1, wherein a specific gravity of the composition is about 1 $g/cm^3$ to about 1.4 $g/cm^3$ at 25° C.

3. The composition of claim 1, wherein the alcohol is methanol and the aldehyde is formaldehyde.

4. The composition of claim 1, wherein a concentration of the calcium lignosulfonate salt is about 10 wt % to about 30 wt %, a concentration of the alcohol is about 0.1 wt % to about 4 wt %, and a concentration of the aldehyde is about 0.1 wt % to about 4 wt %, based on the weight of the composition.

5. A cement slurry comprising:

a lignosulfonate-based cement dispersant, a cement, and water;

wherein the lignosulfonate-based cement dispersant comprises an alcohol, an aldehyde, water, and a calcium lignosulfonate salt having 2 to 10 syringyl groups and no guaiacyl groups;

wherein the alcohol is selected from the group consisting of methanol, ethanol, propanol, iso-butanol, t-butanol, and any combination thereof; and wherein the aldehyde is selected from the group consisting of formaldehyde, acetaldehyde, propanal, butanal, and any combination thereof.

6. The cement slurry of claim 5, further comprising a strength-stabilizing agent, an expansion additive, a weighting agent, a defoamer, a gelling agent, a retarder, or any combination thereof.

7. The cement slurry of claim 6, wherein a concentration of the strength-stabilizing agent is about 10 wt % to about 20 wt %, a concentration of the expansion additive is 0.1 wt % to about 1 wt %, a concentration of the weighting agent is about 10 wt % to about 20 wt %, a concentration of the defoamer is about 0.001 wt % to about 0.1 wt %, a concentration of the gelling agent is about 0.01 wt % to about 1 wt %, and a concentration of the retarder is about 0.1 wt % to about 1 wt %, based on the weight of the cement slurry.

8. The cement slurry of claim 5, wherein a density of the cement slurry is about 2 $g/cm^3$ to about 3 $g/cm^3$ at 25° C.

9. The cement slurry of claim 5, wherein a specific gravity of the lignosulfonate-based cement dispersant is about 1 $g/cm^3$ to about 1.4 $g/cm^3$ at 25° C.

10. The cement slurry of claim 5, wherein the alcohol is methanol and the aldehyde is formaldehyde.

11. The cement slurry of claim 5, wherein a concentration of the calcium lignosulfonate salt is about 10 wt % to about 30 wt %, a concentration of the alcohol is about 0.1 wt % to about 4 wt %, and a concentration of the aldehyde is about 0.1 wt % to about 4 wt %, based on the weight of the lignosulfonate-based cement dispersant.

12. The cement slurry of claim 5, wherein a concentration of the lignosulfonate-based cement dispersant is about 0.1 wt % to about 2 wt %, a concentration of the cement is about 30 wt % to about 60 wt %, and a concentration of the water is about 10 wt % to about 30 wt %, based on the weight of the cement slurry.

13. The cement slurry of claim 5, wherein the cement is a hydraulic cement.

14. The cement slurry of claim 5, wherein the cement is a mixture of limestone, clay, and gypsum.

15. The cement slurry of claim 5, wherein the cement is a Class G Portland cement.

16. The cement slurry of claim 5, wherein the cement is a non-hydraulic cement.

17. The cement slurry of claim 5, wherein the cement is a mixture of lime, gypsum, plasters, and oxychloride.

* * * * *